(12) United States Patent
Kruys

(10) Patent No.: US 7,548,520 B2
(45) Date of Patent: Jun. 16, 2009

(54) SELF-ORGANIZING SYSTEM FOR WIRELESS ACCESS

(76) Inventor: Jan P. Kruys, Tiendhof 5, Harmelen, 3481GT (NL)

( * ) Notice: Subject to any disclaimer, the term of this patent is extended or adjusted under 35 U.S.C. 154(b) by 995 days.

(21) Appl. No.: 10/156,194

(22) Filed: May 29, 2002

(65) Prior Publication Data

US 2002/0181428 A1 Dec. 5, 2002

Related U.S. Application Data

(60) Provisional application No. 60/294,091, filed on May 29, 2001.

(51) Int. Cl.
*H04W 4/00* (2009.01)
(52) U.S. Cl. .................. 370/328; 370/394; 370/400
(58) Field of Classification Search .............. None
See application file for complete search history.

(56) References Cited

U.S. PATENT DOCUMENTS

| | | | |
|---|---|---|---|
| 6,031,863 A * | 2/2000 | Jusa et al. | 375/132 |
| 6,091,967 A | 7/2000 | Kruys et al. | |
| 6,192,230 B1 | 2/2001 | van Bokhorst et al. | |
| 6,654,359 B1 * | 11/2003 | La Porta et al. | 370/328 |
| 2002/0122410 A1 * | 9/2002 | Kulikov et al. | 370/349 |
| 2003/0193895 A1 * | 10/2003 | Engwer et al. | 370/241 |

OTHER PUBLICATIONS

Lin et al., "Multihop Wireless IEEE 802.11 LANs: A Prototype Implementation", Aug. 17, 2000, KICS, pp. 1-7.*
Lin et al. "Multihop Wireless IEEE 802.11 LANs: A Prototype Implementation", IEEE 1999, pp. 1568-1572.*
Lin et al. "Multihop Cellular: A New Architecture for Wireless Communications", IEEE INFORCOM 2000, pp. 11273-1282.*

* cited by examiner

*Primary Examiner*—Jayanti K Patel
*Assistant Examiner*—Jung Park

(57) ABSTRACT

An apparatus, method and system for organizing a communication system for wireless access. In the method, wireless access points of a wireless network in the system organize themselves such that each wireless access point knows the lowest number of forwardings (e.g., the hoprank) required to send a user data request from a user to a wired backbone LAN of the system. The user initiates communications to transmit the user data request to an access point having a lowest hoprank in the system. The access point with the lowest hoprank may be an access point that is fixedly connected to the system, or an access point that is not fixedly connected to the system, e.g., a floating access point that communicates with users and other fixed or floating access points over a wireless radio link.

17 Claims, 4 Drawing Sheets

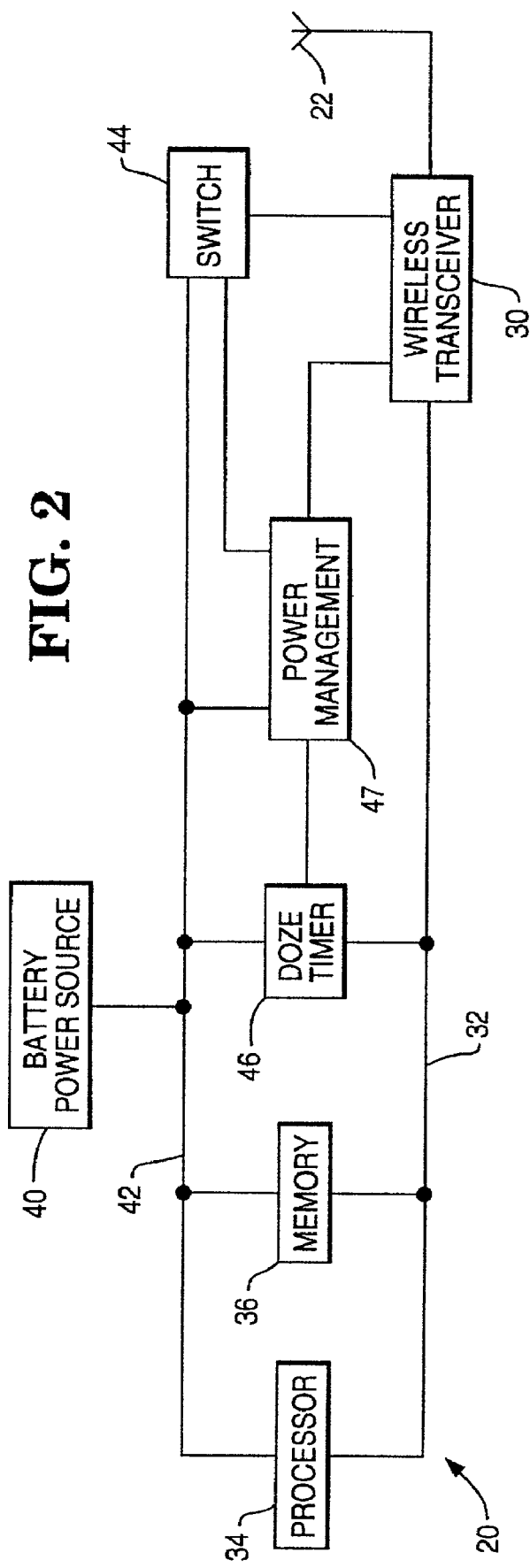
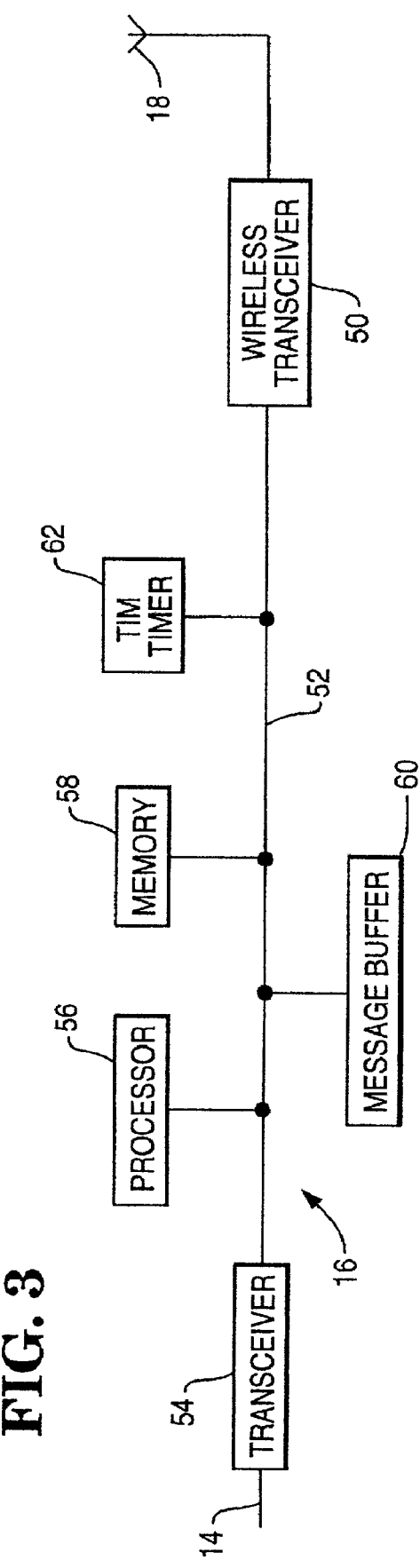
FIG. 2
FIG. 3

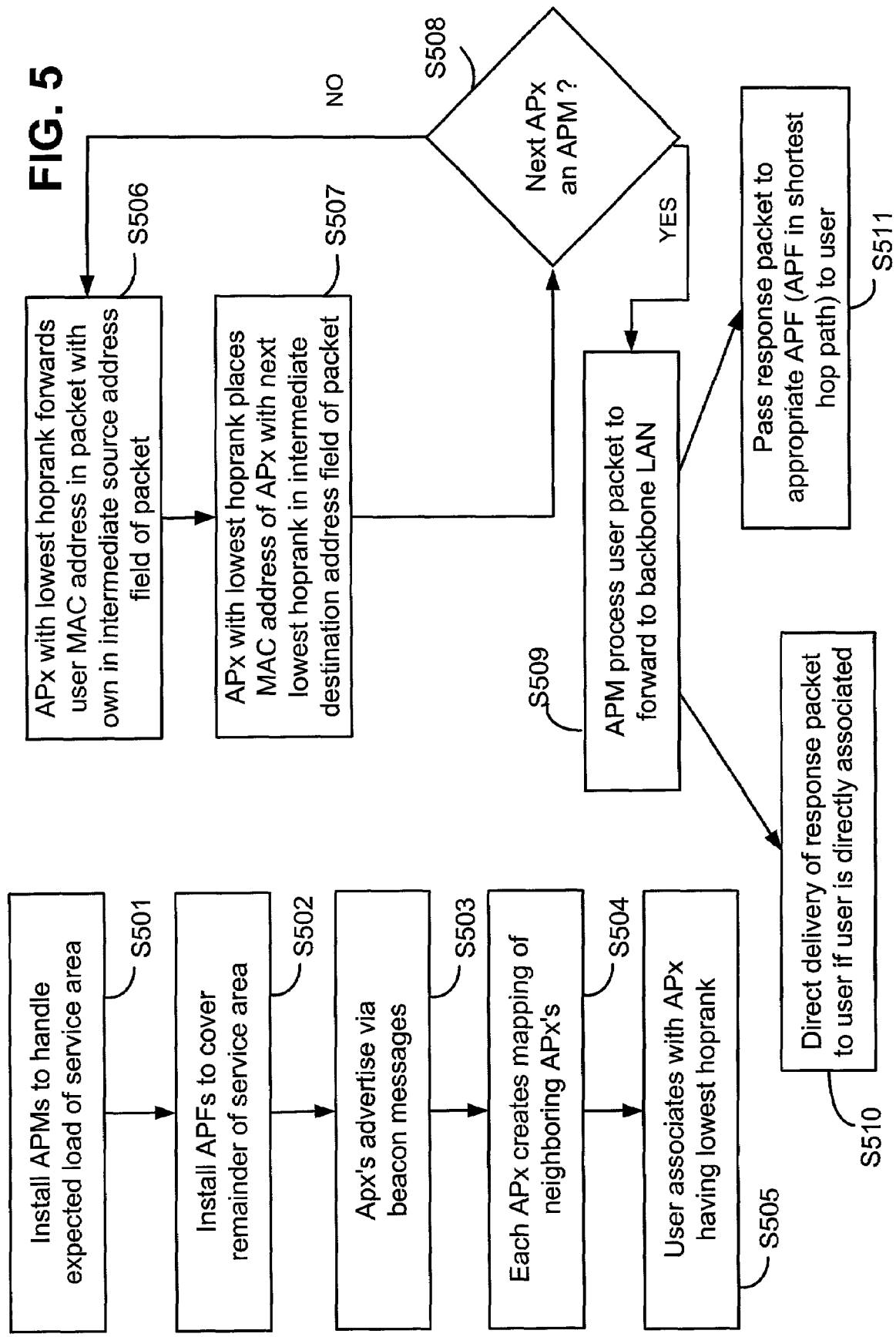

SELF-ORGANIZING SYSTEM FOR WIRELESS ACCESS

CROSS-REFERENCE TO RELATED APPLICATIONS

This patent application claims priority to U.S. Provisional Patent Application No. 60/294,091, filed May 29, 2001, which is herby incorporated by reference herein in its entirety.

BACKGROUND OF THE INVENTION

1. Field of the Invention

The present invention generally relates to wireless communications and more particularly to a method and system for organizing wireless access.

2. Description of Related Art

Wireless communications has experienced a tremendous growth in the past few years. As a result, there is an ever increasing demand by users to use these systems to convey not only voice signals, but also data signals and video signals. Several wireless communication systems have emerged as accepted standards in various parts of the world. Some of the major wireless communication systems include the Advanced Mobile Phone Service (AMPS), Personal Communication Services (PCS), GSM (Group Speciale Mobile), the High Performance Radio Local Area Network (HIPERLAN) and its U.S. equivalent, IEEE 802.11 systems. Some of these systems are analog systems while others are digital. That is, some of these systems use analog modulation techniques while others use digital modulation techniques. Also, these systems allow their subscribers to access their equipment in different manners.

With the advent of the Internet, subscribers of communication systems expect and require to have global communication capabilities regardless of their physical location or their particular service provider. Users of wireless communication systems have the same expectations and needs. New frequency spectrum allocations are being created to satisfy the increasing demand for wireless services and new standards are being created.

As a result, system parameters (e.g., bandwidth, frequency of operation, transfer rate) are in a state of flux. In addition, factors such as sudden increases in subscriber usage or changing radio signal propagation conditions effect the performance of the system in operation. Consequently, system providers, at their great expense, often have to change or modify their system equipment to comply with changing parameters and conditions.

Accordingly, ubiquitous access to wireless services requires a dense infrastructure that is costly to install and maintain. Further, such infrastructure is not flexible, since access points are typically connected to a wired backbone or grid such as a backbone Ethernet network. For example, a seasonal event, emergency situation or major transitory international event such as the Olympic Games might require additional temporarily infrastructure to be added to the fixed infrastructure in order to handle the voice, data and video demands required of such an event. Additionally, where fiscal constraints would make the expansion of a fixed infrastructure impractical, service providers still desire the means to reach and serve remote areas of citizens and/or areas which are topographically unreasonable to augment an existing fixed infrastructure

SUMMARY OF THE INVENTION

The present invention provides an apparatus, method and system for organizing a communication system for wireless access. The system includes access points that are a connected directly to a wired backbone of the system, and access points connected by wireless means to the wired backbone. At a given instant or location, a user can communicate with a number of access points that belong to a given network.

In the method, a user initiates communications with an access point having a lowest hoprank in the system. The hoprank indicates the number of forwardings required to send a user data request from the user to a wired backbone infrastructure (e.g., backbone network) of the system. In an embodiment, the access point with the lowest hoprank is fixedly connected to the system, and receives the user data request directly from the user to determine how to send a packet of information to the requesting user. In another embodiment, the user initiates communications with an access point that is not fixed to the system, e.g., a floating access point that communicates with users and other fixed or floating access points over a wireless radio link. The floating access point forwards data packets of the requesting user over the wireless link to another access point, which may or may not be an access point that is fixedly connected to the system.

BRIEF DESCRIPTION OF THE DRAWINGS

The present invention will become more fully understood from the detailed description given hereinbelow and the accompanying drawings, wherein like elements are represented by like reference numerals, which are given by way of illustration only and thus are not limitative of the present invention and wherein:

FIG. 2 is a block diagram of a user in accordance with an exemplary embodiment of the present invention;

FIG. 3 is a block diagram of an access point in accordance with an exemplary embodiment of the present invention;

FIG. 5 is a flow chart describing the method in accordance with an exemplary embodiment of the present invention.

DETAILED DESCRIPTION

Figure 1:
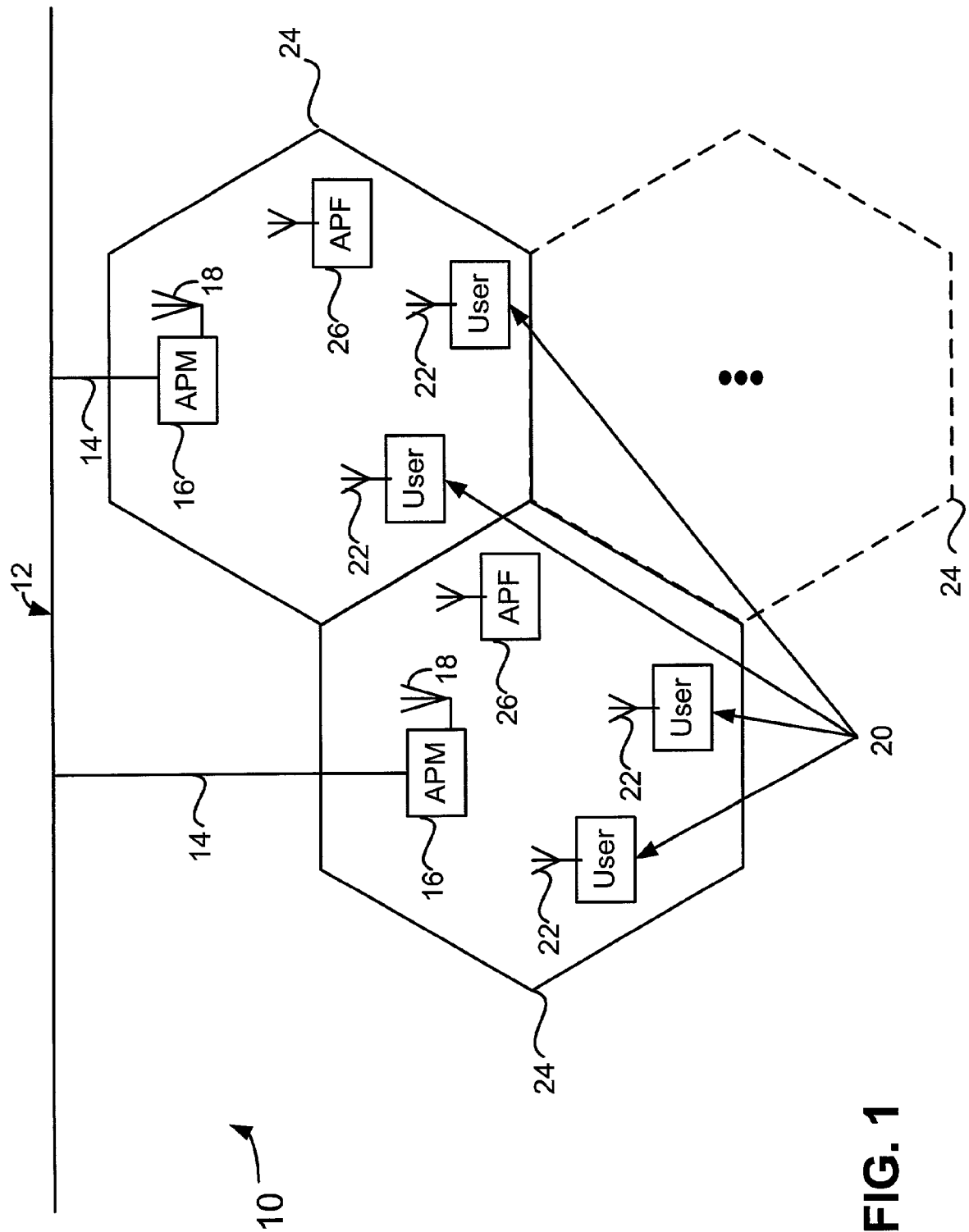
FIG. 1 illustrates a system in accordance with an exemplary embodiment of the invention.

Although the principles of the invention are particularly well-suited to the wireless communications systems described above, and further may be based on the well-known IEEE802.11 Wireless LAN standard, it should be noted that the embodiments shown and described herein are meant to be illustrative only and not limiting in any way. As such, various modifications will be apparent to those skilled in the art for application to other transmission systems and are contemplated by the teachings herein.

Where used below, the term beacon refers to a broadcast message that is typically used by an access point to inform users and other access points in its vicinity of available facilities and services supported by the access point. As used herein, APM refers to a moored access point that is fixedly connected to a wireless backbone network, (i.e., via a wired link such as a cable). Additionally as used herein, APF is a floating access point that is wireless (e.g., not fixedly connected to a communication network or system). Where used below, APx may refer to an APM and/or an APF. Further, the term user referred to below represents a wireless user device and is interchangeable with wireless mobiles stations or user equipment (UE), as is known in the art. A user may be embodied as part of a PC, PDA or other known or contemplated wireless access device.

Additionally as used below, the phrase service link refers to a logical link used by the user to communicate with either an APF or APM using, for example, a standard wireless LAN protocol like 802.11 and its evolving components. The term infrastructure link is a logical link used by the APFs to communicate with other APFs or APMs using a suitable communications protocol, e.g. a subset of the IEEE 802.11 wireless LAN protocol.

The present invention provides an apparatus, method and system for organizing a communication system for wireless access. The system includes access points that are a connected directly to a wired backbone of the system, and access points connected by wireless means to the wired backbone. At a given instant or location, a user can communicate with a number of access points that belong to a given network.

In an exemplary embodiment, a user initiates communications with an access point having a lowest available hoprank. The hoprank indicates the number of forwardings required to send user data from the associating user to the wired backbone network.

In another exemplary embodiment, the access point with the lowest hoprank is fixedly connected to the backbone network The access point receives the user data directly from the user, and forwards it to the backbone network.

In a further exemplary embodiment, the user initiates communications with an access point that is not fixedly connected to the backbone network. This "floating" access point forwards the data received from the user to another access point with the next lower hoprank. This process may be repeated until the user data reaches an access point that is fixedly connected to the backbone network.

As will be seen in more detail below, the method and system of the present invention provides a self-organizing communication system that is equally adaptable to short range, high density communication scenarios or situations, and to long range, low density situations. The elements utilized herein include, but are not limited to: wireless user devices; wireless and wired infrastructure elements; wireless LAN technology as exemplified by the IEEE 802.11 standard and its evolving components; use and re-use of the same RF channel to communicate between infrastructure elements and users, as well as between infrastructure elements; re-use of adaptively scaling radio link capacity, e.g. to meet instantaneous needs of users (service links) as well as the needs of connections between access points (infrastructure links); adaptive self-organization of the wireless infrastructure to provide an optimum path between the user and the wired infrastructure; and special signaling protocols to support the self-organization of infrastructure elements. Further, the same, re-usable radio link may be used at different times as a service link or as an infrastructure link. Alternatively, dedicated radio links may be employed for infrastructure links and service links.

The advantages of using APFs include lower cost of installation, as well as much higher deployment flexibility for a communication system. Such flexibility extends to all kinds of situations and contemplated scenarios, including newscasting at popular games, mass events, support networks for major calamities, etc.

Referring first to FIG. 1, there is shown a block diagram of a wireless system 10 embodying the present invention. The wireless system 10 includes a backbone infrastructure such as a backbone local area network (LAN) 12, which is a wired, cable-based LAN, and which includes a suitable link such as a cable 14 for example, to connect to one or more base station(s), referred to herein as an APM 16. Each APM 16 has an antenna 18. A server may be connected to the cable 14 to provide a server function for devices communicating with the LAN 12. However, instead of or in addition to the server, other devices or networks may be coupled to the LAN 12 to provide a communications infrastructure. APM 16 is fixedly connected (e.g., wired) to and interacts with the backbone LAN 12 using the Ethernet protocol or an IP based protocol over a suitable connection such as a cable 14, for example.

Also included in the system are a plurality of users 20. The users 20 have antennas 22, referenced individually as antennas 22. Each APM 16 has a coverage area, referred to herein as cell 24. It should be understood that additional APMs (not shown), may be connected to the cable 14 and form part of the backbone LAN 12. Each user 20 communicates with only one APM 16 at any one time, depending on which cell 24 the user 20 is currently located in. This is effected by providing a cell identification portion in messages transmitted in the system, as is known. When a user 20 moves from one cell to another cell, a handover procedure is effected to hand over communications to a new APM 16.

FIG. 2 is a block diagram of a user in accordance with an exemplary embodiment of the present invention. Referring now to FIG. 2, the user 20 includes a wireless transceiver 30 coupled to the antenna 22 and to a bus 32. The user 20 also includes, connected to the bus 32, a processor 34 and a memory 36. Other devices such as a keyboard (not shown) and a display (not shown) may be connected to the bus 32, to enable the user 20 to function as a hand-held data processing device. The user 20 may further be configured to generate as a hand-held wireless scanner by providing a suitable scanning device (not shown) in the user 20. The user 20 may be battery powered, and includes a battery power source 40 connected to a power line 42, which supplies power to the components of the user 20. The power line 42 is connected to supply continuous power to the processor 34 and memory 36. However, power is supplied to the wireless transceiver 30 via a switch 44 that operates under the control of a doze timer 46 and power management circuit 47, as is known.

In this connection, it should be understood that the transceiver 30 of the user 20 is either in an awake state or in a doze state, dependent on the state of the switch 44. The user 20 is operable in either a continuous-active mode, in which the user is always in the awake state, or in a power-save mode, in which the user alternates between doze and awake states. The operation of these states is not explained in detail here, but is described in commonly-owned U.S. Pat. No. 6,192,230 to van Bokhorst et al., the entire contents of which are incorporated herein by reference.

In the awake state the transceiver 30 is fully powered, and capable of receiving or transmitting messages. In the doze state, the transceiver 30 is operated at a much lower power level and is not capable of receiving or transmitting messages. In the doze state, the transceiver 30 consumes significantly less power than when in the awake state. The switch 44 is switched on to initiate an awake state in response to the timing out of the doze timer 46, and is switched off to initiate a doze state by the power management circuit 47 at appropriate times as will be explained hereinafter. An APM 16 maintains a record of the operational mode (continuous-active or power-save) of each user 20 in its cell 24.

FIG. 3 is a block diagram of an access point in accordance with an exemplary embodiment of the present invention. Referring now to FIG. 3, APM 16 includes a wireless transceiver 50 coupled to the antenna 18 and to a bus 52. A further transceiver 54 connected to the bus 52 connects the APM 16 to cable 14 of the backbone LAN 12. Also connected to the bus 52 are a processor 56, a memory 58, a packet buffer 60 and a TIM timer 62, the operation of which is not discussed in detail but which may be referenced in the above-mentioned '230 patent to van Bokhorst et al.

Further, the system and method of the present invention employs one or more APFs 26. An APF 26 is similar in structure to APM 16, however an APF 26 is not fixedly connected to backbone LAN 12 via cable 14, but communicates with users 20, APMs 16 and other APFs 26 over wireless links. Accordingly, since APF 26 is not connected to backbone LAN 12, the transceiver 54 is unnecessary and may be omitted. The following is an exemplary illustration of how an APF 26 may be exploited in the wireless LAN system 10.

A service provider wants to supply customers present in its city center. The service provider offers a variety of services including on-line news, location of interesting places and other tourist information, e-mail and direct access to the internet, etc. In light of the type of information demanded by its customers, the service provider decides to utilize wireless LAN technology.

Since the cost of installing APMs is high, right of way difficult to obtain, and the spread of customers variable (e.g., over the year), the service provider decides to install a combination of fixed APMs 16 on the backbone LAN 12 to provide year-round coverage, and provides additional, seasonally installed (e.g., transitory or temporary) APFs 26 possibly on a closer spacing as the existing APM's 16. The APFs 26 are not equipped with direct links into the backbone LAN 12. Instead, these seasonal APFs 26 are to be served with wireless infrastructure links to the APMs 16 that are directly connected to the backbone LAN 12. As discussed above, these infrastructure links may be embodied as re-usable radio links, or alternatively, as dedicated radio links.

Users of wireless access devices, such as users 20, typically would activate wireless service links of their PC or PDA when they know or assume APFs 26 to be present. A user 20 scans the spectrum to find these APFs 26, associates with the APFs 26, and allows the user 20 to communicate with other systems connected to an APF 26, etc., via some backbone network such as backbone LAN 12. The wireless APFs 26 have no direct connection to the backbone LAN 12, but use a wireless radio link to communicate with an APM 16. This arrangement makes the APFs appear as if they are directly connected to backbone LAN 12, even though physically they are not. Moreover, a user 20 will not see the difference, as the wirelessly-extended APF infrastructure appears homogenous. Thus, APMs 16 act as intermediaries between the wired infrastructure (e.g., backbone LAN 12) and users 20 and/or APFs 26. APFs 26 act as intermediaries between the users 20 and the APMs 16 and/or other APFs 26.

Figure 4:
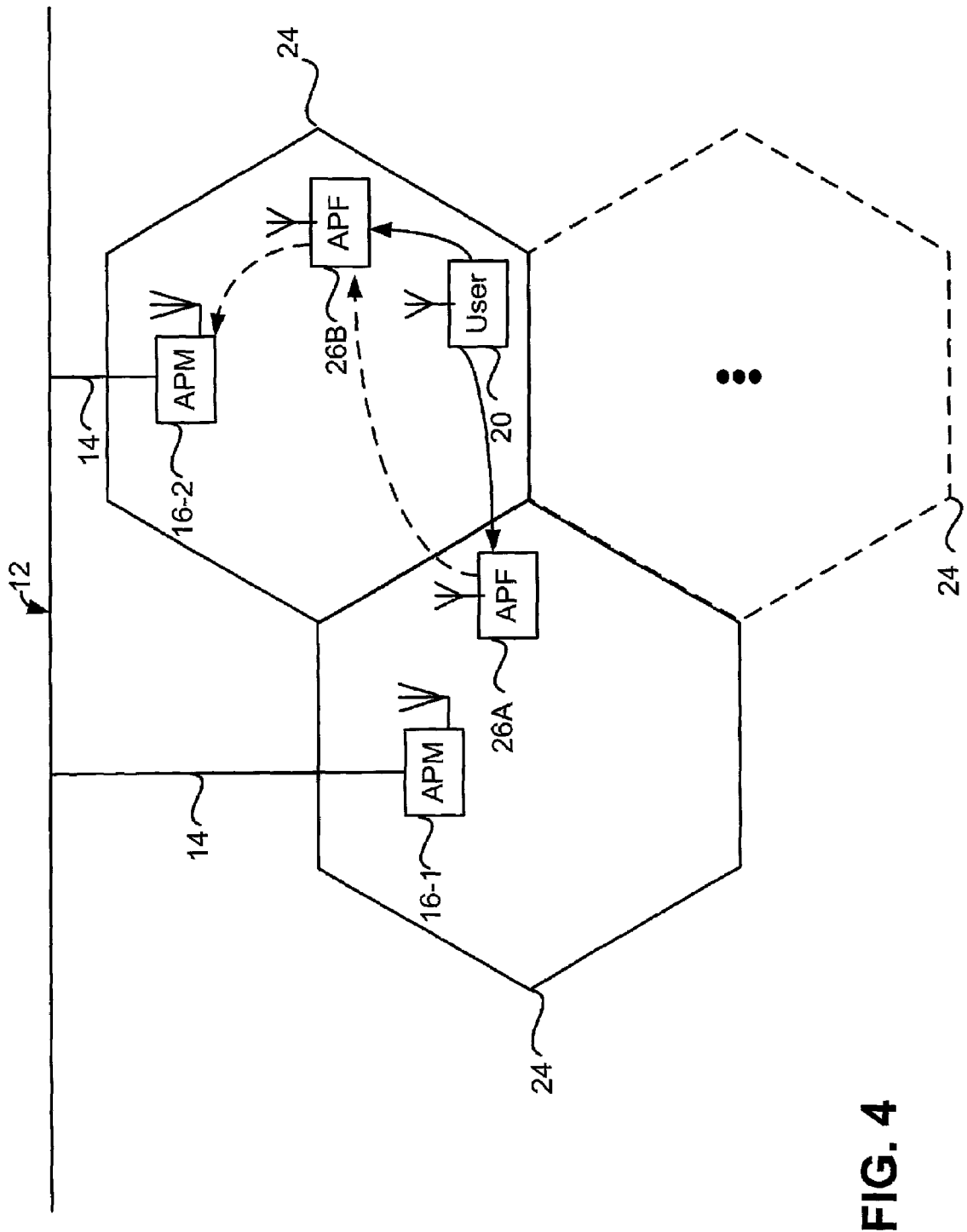
FIG. 4 illustrates an exemplary configuration of the system of FIG. 1.

FIG. 4 illustrates an exemplary configuration of the system. Each APF 26A and 26B keeps track of the number of "hops" through other APFs 26 that are needed to deliver a message or packet to an APM 16-1 or 16-2. This number is called the "hoprank" and is always relative to a particular APM 16-1 or 16-2. The rank of an APM 16-$n$ (n=1 to ... x) may be set to zero. This is advertised in its beacon to users 20 and other APx's in the system 10. Further, each APF 26A, 26B ... 26$n$ regularly advertises its rank relative to the closest APM 16-$n$ in its beacon transmissions. As shown in FIG. 4, APFs 26A and 26B communicate with users 20, other APFs and APMs 16-1 and 16-2 over wireless radio links. The wireless link between an APF 26A/26B and a user 20 may be embodied as a service link (solid arrows); and the wireless links between an APF 26A/26B and an APM 16-1/16-2 may be embodied as an infrastructure link (dashed arrows).

An APF 26$n$ that receives a broadcast with a hoprank of x sets its own hoprank to x+1 and rebroadcasts this value. In one embodiment, each APF 26A/26B begins with a hoprank of 15. An APF 26A/26B, etc. that has not received a broadcast or which would have a hoprank less than 15 maintains its hoprank at 15. As shown in FIG. 4, APF 26A has a hoprank=1 relative to APM 16-1; and APF 26B has a hoprank=2 relative to APM 16-1, and a hoprank=1 relative to APM 16-2. Therefore APF 26B would advertise its hoprank as 1. In case communications with APM 16-2 fail, APF 26B would have to connect to APF 26A and its hoprank would increase to 2.

Users 20 communicate preferentially with an APF 26 of the lowest available rank in its cell 24. In other words, an APF 26 having the lowest hoprank means that it requires the fewest number of forwardings (hops) to get to an APM 16 at the backbone LAN 12 for the same message and hence, is the most efficient use of the spectrum. As shown in FIG. 4, assuming that APF 26A does not have an infrastructure link to APM 16-1 and further assuming that user is communicating over service link 28 with APF 26B, user 20 preferentially communicates with APF 26B because its hoprank to APM 16-2 is 1 (e.g., this is the shortest path to the wired backbone LAN 12; versus communicating with APF 26A, which would require an additional forwarding over infrastructure links 30 to get to backbone LAN 12 via APM 16-1.

An APx may re-use the same radio hardware for communicating with the users 20 and for communicating with other APx's. This is called re-use of a service link for infrastructure communications,. Additionally, an APx may use different, dedicated radio devices operating in different bands for the service links and the infrastructure links.

FIG. 5 is a flowchart describing a method in accordance with the invention. The operation of system 10 is now described. A service provider that wants to provide wireless access to the Internet in a given area installs a number of APMs 16 (Step S501) such that the expected traffic load can be handled with reasonable attach rates (e.g., the number of associations (e.g., temporary relationships established for communicating between a user 20 and an APx) supported by each APM 16) and reasonable service delays (as experienced by a given user at any point in time). The APMs 16 are attached to a high speed backbone network (e.g., backbone LAN 12) via cable 14 for example). The service area may be so large that the coverage provided by the APMs 16 is only part of the total service area. In this case, the service provider installs APFs 26 (Step S502). These APFs are positioned so as to assure radio coverage, but are not fixedly connected to the backbone LAN 12.

Each APx use broadcasts of their hoprank to advertise their relationships to each other. This allows each APx to determine the best path to the wired infrastructure at backbone LAN 12. Each APx broadcasts regular beacons, etc. (Step S503) that give network name, loading, operating data rates, and its hoprank. Each APx notes their relationship with other APx's and creates mappings (Step S504) between user packets carried, and the neighboring APx that delivered or received these packets. Such mappings may be stored in memory in a suitable address mapping table, as is known.

Each APx may be configured so as to keep track of aging (e.g., inactive user addresses) and clean-up of the address mapping tables kept by each APx. These aging and clean-up functions may be optionally included in each APx, and are known in the art. The default setting may be set to an aging function; e.g., after a (user) address has not been used for a predetermined amount of time (i.e., several seconds), the user address is removed from the address mapping table. For an active clean-up function, an APF from which a user disassociates (user terminates temporarily-established relationship to communicate) may send an uplink broadcast to announce that the APF is no longer active.

Users 20 that wish to associate (communicate) with the Internet or otherwise access the backbone LAN 12 associates (Step S505) with an APx having the lowest hoprank. In this context, associating means establishing a temporary relationship for the purpose of communicating between a user 20 and an APx.

Every packet originated by a user 20 contains two sets of (MAC) addresses (as per IEEE 802.11)—original source and destination address, and intermediate source and destination address. A MAC address is an address of a device (e.g., user 20, or APx, etc.) identified at the media access control layer of the network architecture (e.g., backbone LAN 12). The former MAC address identifies the user 20 and the serving device (e.g., APx). The latter MAC address identifies the address of the sender and the receiver of a particular packet. The first APF (e.g., APF having the lowest hoprank, relative to the user 20 in its cell 24) to receive such a packet, before forwarding the packet to the next APx, puts its own address (Step S506) into the intermediate source address field of the packet, and puts the address of the next APx (e.g., APx with the next lowest hoprank in the chain, to which the first APF will forward the address to) in the intermediate destination address field of the packet (Step S507).

Accordingly, if the APx receiving the forwarded user data from Step S507 is not an APM 16, (NO at Step S508), each successive APF 26 in the chain between a user 20 and the APM 16 repeats this process. Eventually, an APM 16 will be in the chain and will remove the intermediate addresses from all packets it receives from user 20 and from APFs 26; and will insert these address into packets it sends to user 20 via APFs 26 in response to the user data request to the backbone LAN 12 of the system 10.

If the APx with the next lowest hoprank is an APM 16 (YES at Step S508), then the APM 16 receives the forwarded data packets and uses relationships and mappings defined in Step S504 to determine how to process packets. Accordingly, a packet received from a user 20 is forwarded (Step S509) to the infrastructure network (e.g., backbone LAN 12) and, conversely, a packet destined for a directly-associated user 20 (e.g. user 20 who is directly associating with an APM 16), is directly delivered (Step S510) to that user 20 from the backbone LAN 12. Packets destined for indirectly-associated users 20 (communicating with the LAN 12 via one or more APFs 26 and an APM 16) are passed to the appropriate APF 26 (Step S511), e.g., the APF 26 arranged at the head of the shortest "hop path" towards the user 20.

Thus, broadcast messages are passed up and down the chain of APx's such that no loops (i.e., broadcast messages are never repeated by the same APx) occur. This requires that messages be marked as "uplink" or "downlink" relative to the wired infrastructure (e.g., backbone LAN 12), together with the hoprank of the originator. A uplink broadcast is only repeated if the hoprank of the transmitting APF 26 is higher than the hoprank of the receiving APx. A downlink broadcast is repeated only if the hoprank of the transmitting APx is less than the hoprank of the receiving APF 26.

In addition to the above, the present invention envisions use of a scalable radio link which can be utilized between any of the user 20, APM 16 and/or APF 26, as described in U.S. Pat. No. 6,091,967 by the inventor, the entire contents of which are incorporated by reference herein. Particularly, a scalable radio platform (SRP) as described in the '967 patent may interface with each of the elements described above in order to provide a radio link that can be dynamically reconfigured to meet instantaneous changes in user 20 demand.

One example of a scalable radio link is a multiple transmitter/multiple receiver link that can be configured to operate as a single Tx/Rx link or a multiple Tx/Rx link; the latter link would offer much higher data rates than the former. Each transmitter/receiver pair can support a data stream that is additional to the data stream supported by other such transmitter/receiver pairs belonging to the same set of stations.

The IEEE 802.11 protocol allows an APx to broadcast its "absence". Thus, an APF 26 that has received packets from an associated user 20, which must be forwarded to another APx, may do so by announcing its absence, changing its radio configuration so as to terminate the use of its service link and to activate its infrastructure link, and, during this absence, communicating with a peer APx to deliver and receive uplink and downlink packets.

This absence can be used for serving the infrastructure link with another APx without disrupting (albeit delaying) the communications with user devices (using the service link). In one embodiment, the service link may be realized by means of a single transmit/receive antenna, so as to provide adequate data transmission capacity for communicating with user devices. In the same embodiment, the access point may re-configure its antennas and communication circuits to realize a multiple transmit/multiple receive infrastructure link, with much higher capacity than the service link, between itself and another APx.

In another embodiment, an APx employs a single transmit receive antenna so as to provide adequate data transmission capacity for communicating with user devices. However, the APx uses a separate, directional antenna to communicate with another APx also employing a directional antenna. In this way, an APx creates an infrastructure link with much higher capacity than the service link between.

In a further embodiment, APx's may employ different schemes to perform error correction encoding of the data exchanged between two or more APx's, so as to realize a higher data rate on the infrastructure link than on the service link. In all embodiments, the APx may also adapt the communications protocol utilized between themselves to increase data rates. These embodiments are examples of how the same radio circuits may be used in a scalable, re-configurable manner to yield different levels of performance for different purposes. The invention being thus described, it will be obvious that the same may be varied in many ways. For example, the functional blocks in the figures may be implemented in hardware and/or software. The hardware/software implementations may include a combination of processor(s) and article(s) of manufacture. The article(s) of manufacture may further include storage media and executable computer program(s). The executable computer program(s) may include the instructions to perform the described operations. The computer executable program(s) may also be provided as part of externally supplied propagated signal(s). Such variations are not to be regarded as departure from the spirit and scope of the invention, and all such modifications as would be obvious to one skilled in the art are intended to be included within the scope of the following claims.

What is claimed is:

1. A user for communicating with a backbone infrastructure comprising:

a processor for generating a request by the user to the backbone infrastructure for a packet of data and selecting one of a plurality of moored or floating access points based on a received broadcast therefrom of a number of forwardings required to send the user data request to the backbone infrastructure of a wireless communication system, wherein the user data request includes a set of media access control (MAC) addresses including original source and destination addresses and a set of MAC addresses including replaceable intermediate source and intermediate destination addresses, wherein the intermediate destination address is dynamic until the intermediate destination address is the same as the original destination address and the intermediate source address is dynamic until the intermediate source address is the same as the MAC address for a moored access point; and a transceiver for transmitting the user data request to the selected access point.

2. The user as recited in claim 1, wherein each of the moored access points are fixedly connected to the backbone infrastructure and wherein each of the moored access points broadcast a number of forwardings required to send the user data request from the moored access point to the backbone infrastructure.

3. The user as recited in claim 1, wherein each of the floating access points are wirelessly connected to an other floating access point or one of the moored access points and wherein each of the floating access points broadcast a number of forwardings required to send the user data request from the floating access point to the backbone infrastructure.

4. The user as recited in claim 1, wherein the user communicates with the selected one of a plurality of the moored or floating access points via a wireless link.

5. The user as recited in claim 4, wherein the wireless link is a re-usable radio link.

6. The user as recited in claim 4, wherein the wireless link is a service link.

7. The user as recited in claim 1, wherein the requested data packet is delivered from the backbone infrastructure.

8. A method of communicating with a backbone infrastructure of a wireless communication system, comprising:

generating by a user, with a processor, a request to the backbone infrastructure for a packet of data, wherein the user data request includes a set of media access control (MAC) addresses including original source and destination addresses and a set of MAC addresses including replaceable intermediate source and intermediate destination addresses and wherein the method further comprises:

inserting the MAC address of the access point with the lowest number of forwardings into the intermediate source address;

inserting the MAC address of the access point with a lower number of forwardings required to send the user data request to the backbone infrastructure into the intermediate destination address;

forwarding the user data request to the access point with the intermediate destination address;

repeating the inserting of MAC addresses into the intermediate source and destination addresses in the same manner until the access point with the lower number of forwardings is a moored access point; and forwarding the user data request from the moored access point to the backbone infrastructure;

selecting one of either a moored or floating access point based on a broadcast from each thereof that indicates a number of forwardings required to send the user data request to the backbone infrastructure; and transmitting, with a transceiver, the user data request to an access point having a lowest number of forwardings, relative to the user, to the backbone infrastructure.

9. The method as recited in claim 8, wherein a user communicates with the selected one of either the moored or floating access point via a wireless link.

10. The method as recited in claim 9, wherein the wireless link is a re-usable radio link.

11. The method as recited in claim 9, wherein the wireless link is a service link.

12. The method as recited in claim 8, further comprising:

delivering the requested data packet from the backbone infrastructure.

13. A wireless communication system comprising:

a backbone infrastructure;

a moored access point fixedly connected to the backbone infrastructure that broadcasts a number of forwardings required to send a user data request from the moored access point to the backbone infrastructure;

a floating access point wirelessly connected to an other floating access point or one of the moored access points that broadcasts a number of forwardings required to send a user data request from the floating access point to the backbone infrastructure; and a user for communicating with the backbone infrastructure comprising:

a processor for generating a request by the user to the backbone infrastructure for a packet of data and selecting one of a plurality of moored or floating access points based on a received broadcast therefrom of a number of forwardings required to send the user data request to the backbone infrastructure, wherein the user data request includes a set of media access control (MAC) addresses including original source and destination addresses and a set of MAC addresses including replaceable intermediate source and intermediate destination addresses, wherein the intermediate destination address is dynamic until the intermediate destination address is the same as the original destination address and the intermediate source address is dynamic until the intermediate source address is the same as the MAC address for a moored access point; and a transceiver for transmitting the user data request to the selected access point.

14. The wireless communication system of claim 13, wherein the user communicates with the selected one of a plurality of the moored or floating access points via a wireless link.

15. The wireless communication system of claim 14, wherein the wireless link is a re-usable radio link.

16. The wireless communication system of claim 14, wherein the wireless Link is a service link.

17. The wireless communication system of claim 13, wherein the requested data packet is delivered from the backbone infrastructure.

* * * * *

UNITED STATES PATENT AND TRADEMARK OFFICE
CERTIFICATE OF CORRECTION

| | | |
|---|---|---|
| PATENT NO. | : 7,548,520 B2 | Page 1 of 1 |
| APPLICATION NO. | : 10/156194 | |
| DATED | : June 16, 2009 | |
| INVENTOR(S) | : Jan P. Kruys | |

It is certified that error appears in the above-identified patent and that said Letters Patent is hereby corrected as shown below:

Title Page add Item:

-- (73) Assignee: Agere Systems Inc., Allentown, PA 18109 --

Signed and Sealed this

Thirteenth Day of April, 2010

David J. Kappos
*Director of the United States Patent and Trademark Office*